(12) United States Patent
Foisy

(10) Patent No.: US 8,104,350 B2
(45) Date of Patent: Jan. 31, 2012

(54) AUTOMATED THICKNESS MEASUREMENT DEVICE

(75) Inventor: Dave M. Foisy, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 505 days.

(21) Appl. No.: 12/394,471

(22) Filed: Feb. 27, 2009

(65) Prior Publication Data

US 2010/0218590 A1 Sep. 2, 2010

(51) Int. Cl.
*G01N 29/24* (2006.01)
*G01N 29/26* (2006.01)

(52) U.S. Cl. .............. 73/634; 73/644; 73/627; 73/866.5

(58) Field of Classification Search ............ 73/618–622, 73/632–639, 627–629, 584–586, 661, 644, 73/866.5

See application file for complete search history.

(56) References Cited

U.S. PATENT DOCUMENTS

| | | | | |
|---|---|---|---|---|
| 3,205,702 A | * | 9/1965 | Joy | 73/639 |
| 3,883,841 A | * | 5/1975 | Norel et al. | 367/25 |
| 4,242,744 A | * | 12/1980 | Rottmar | 367/173 |
| 4,494,410 A | | 1/1985 | Van Bochove et al. | |
| 5,507,185 A | | 4/1996 | Pickens | |
| 5,549,004 A | * | 8/1996 | Nugent | 73/622 |
| 7,263,889 B2 | * | 9/2007 | Kennedy et al. | 73/620 |

FOREIGN PATENT DOCUMENTS
DE 10302312 A1 8/2004

OTHER PUBLICATIONS

European Patent Office, Extended European Search Report for EP Application No. 10250310.9 mailed Jun. 30, 2010.
Nelligan, "An Introduction to Ultrasonic Thickness Gaging," located http://www.olympus-ims.com/en/applications-and-solutions/introductory-ultrasonics/introduction-thickness-gaging, 4 pages, 2008.
Cotter et al., "Improving the Reliability of High-Performance Ceramics Using Nondestructive Evaluation," Ceram. Eng. Sci. Proc., 9[9-10], pp. 1503-1516, 1988.
Blessing, et al., "In-Process Ultrasonic Thickness Metrology Applied to Steel Parts of Rotation," Review of Progress in Quantitative Nondestructive Evaluation, vol. 10B, pp. 2149-2156, 1991.
"Standard Practice for Measuring Thickness by Manual Ultrasonic Pulse-Echo Contact Method," ASTM, E 797—95, 6 pages, 1995.
"Standard Practice for Measuring Ultrasonic Velocity in Materials," ASTM E 494—95 (Reapproved 2001), 13 pages, 2001.

(Continued)

*Primary Examiner* — Helen C. Kwok
(74) *Attorney, Agent, or Firm* — Klintworth & Rozenblat IP LLC

(57) ABSTRACT

A transducer apparatus may include a slide housing, an inner housing, a member attached to the inner housing, a free-floating transducer housing, a transducer, and transducer springs. The inner housing may be moveably disposed within the slide housing. The member attached to the inner housing may be for moving the inner housing relative to the slide housing. The free-floating transducer housing may in at least one position be freely moveably disposed relative to the inner housing. The transducer may be attached to the free-floating transducer housing and may freely change orientations relative to a surface being measured when the free-floating transducer housing is in the at least one position. The transducer springs may attach the free-floating transducer housing to the inner housing.

25 Claims, 5 Drawing Sheets

OTHER PUBLICATIONS

Papadakis, "Ultrasonic Phase Velocity by the Pulse-Echo-Overlap Method Incorporating Diffraction Phase Corrections," The Journal of the Acoustical Society of America, vol. 42, No. 5, pp. 1045-1051, 1967.

Lynnworth et al., "Ultrasound Propagation Measurements and Applications," International Advances in Nondestructive Testing, vol. 5, pp. 71-115, 1977.

Cotter et al., "High Frequency Ultrasonic Thickness and Acoustic Velocity Measurement Methods for Advanced Material and Component Characterization," http://www.ndt.net/article/ecndt02/175/175.htm, vol. 7, No. 10, 12 pages, 2002.

Richerson, "Modern Ceramic Engineering" Marcel and Decker, Inc., pp. 279-282, 1982.

McMaster, "Nondestructive Testing Handbook" New York, Ronald Press, p. 43, 1959.

Krautkramer et al; "Ultrasonic Testing of Materials", $3^{rd}$ Edition; Berlin, Heidelberg, New York, pp. 5-9, 1983.

Diederichs, "Ultrasonic Wall Thickness Method", located http://www.ndt.net/article/rohrext/us_prinz/us_pri_e.htm, 2 pages, 1995.

* cited by examiner

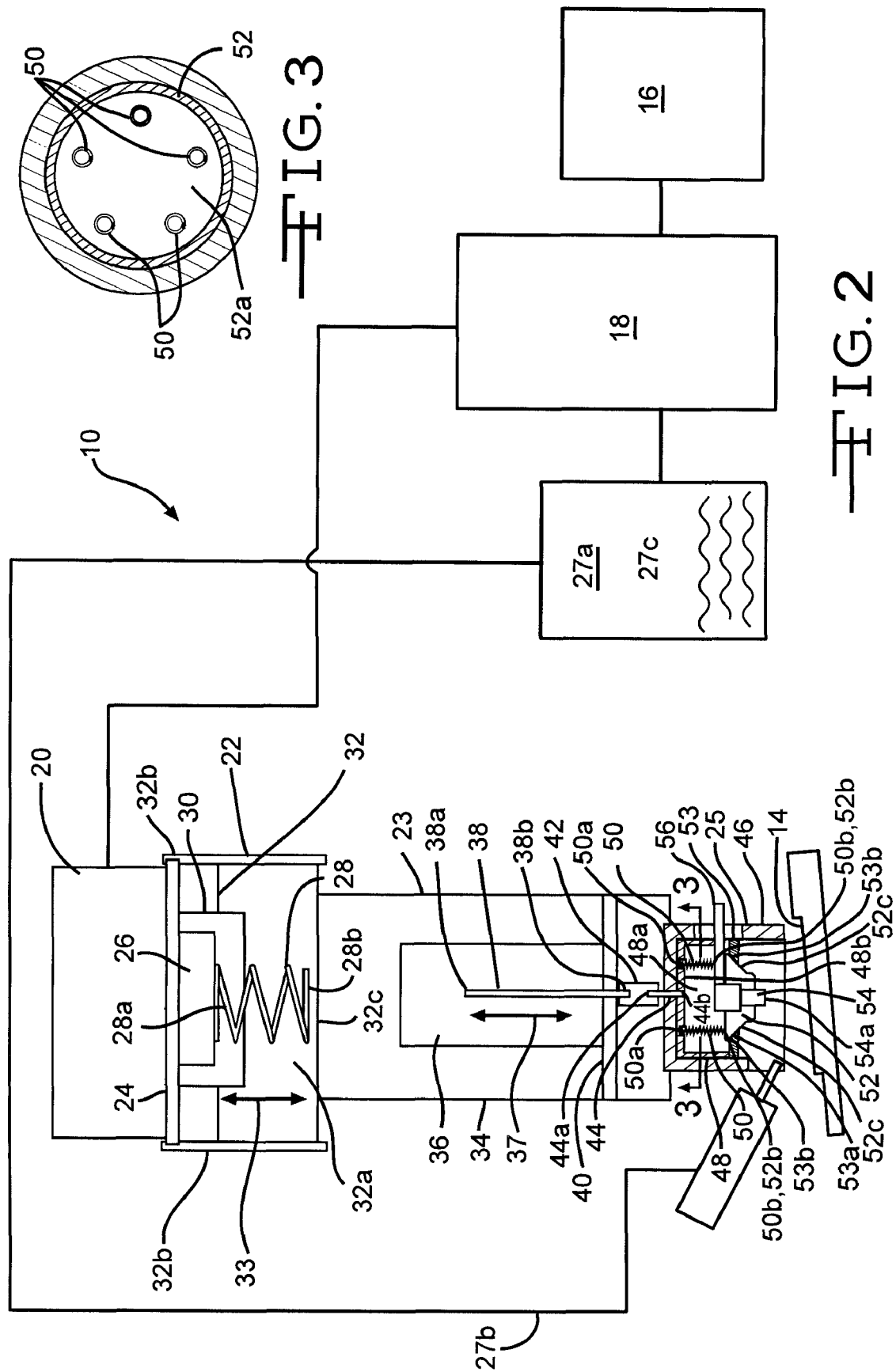

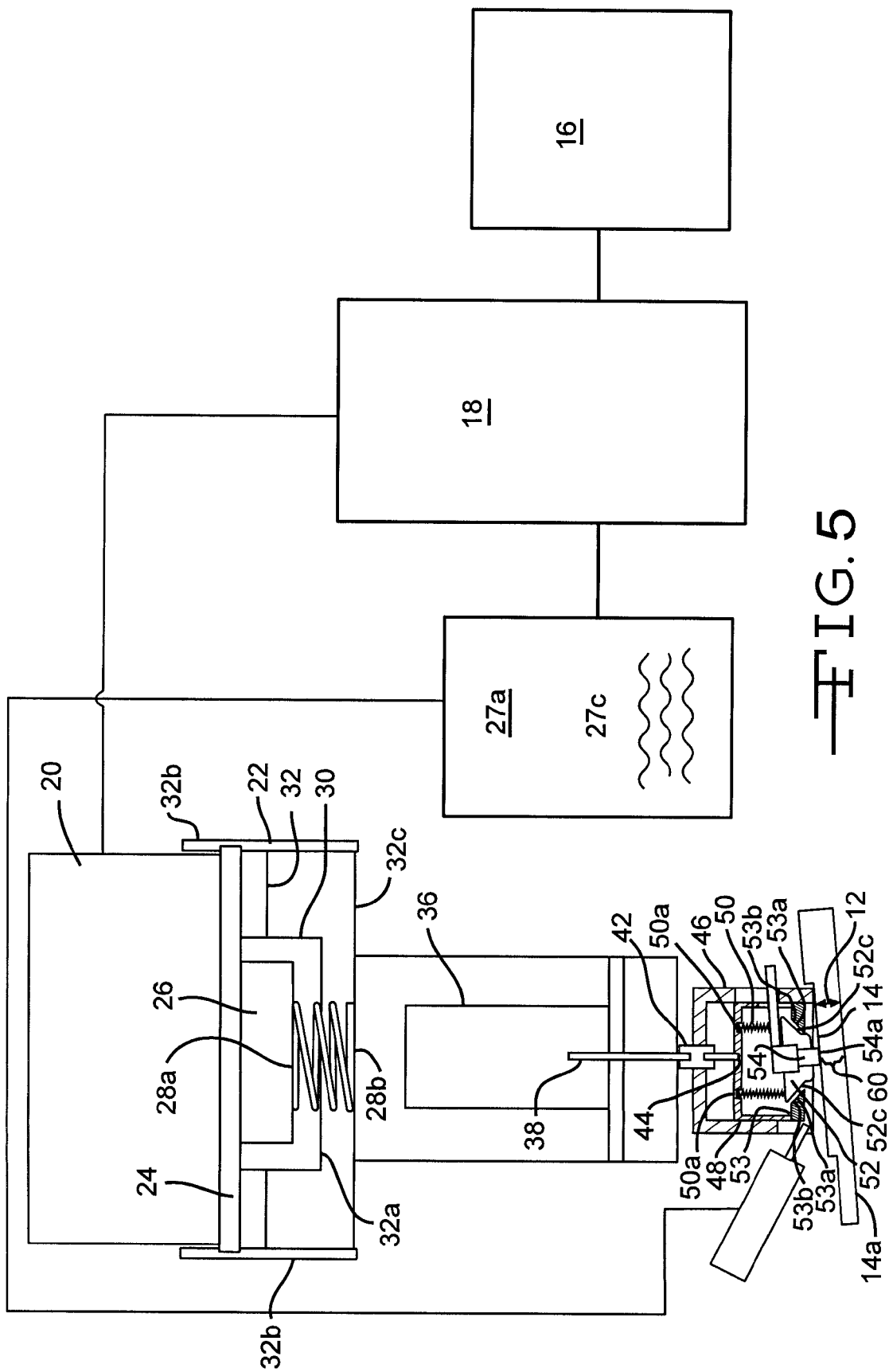

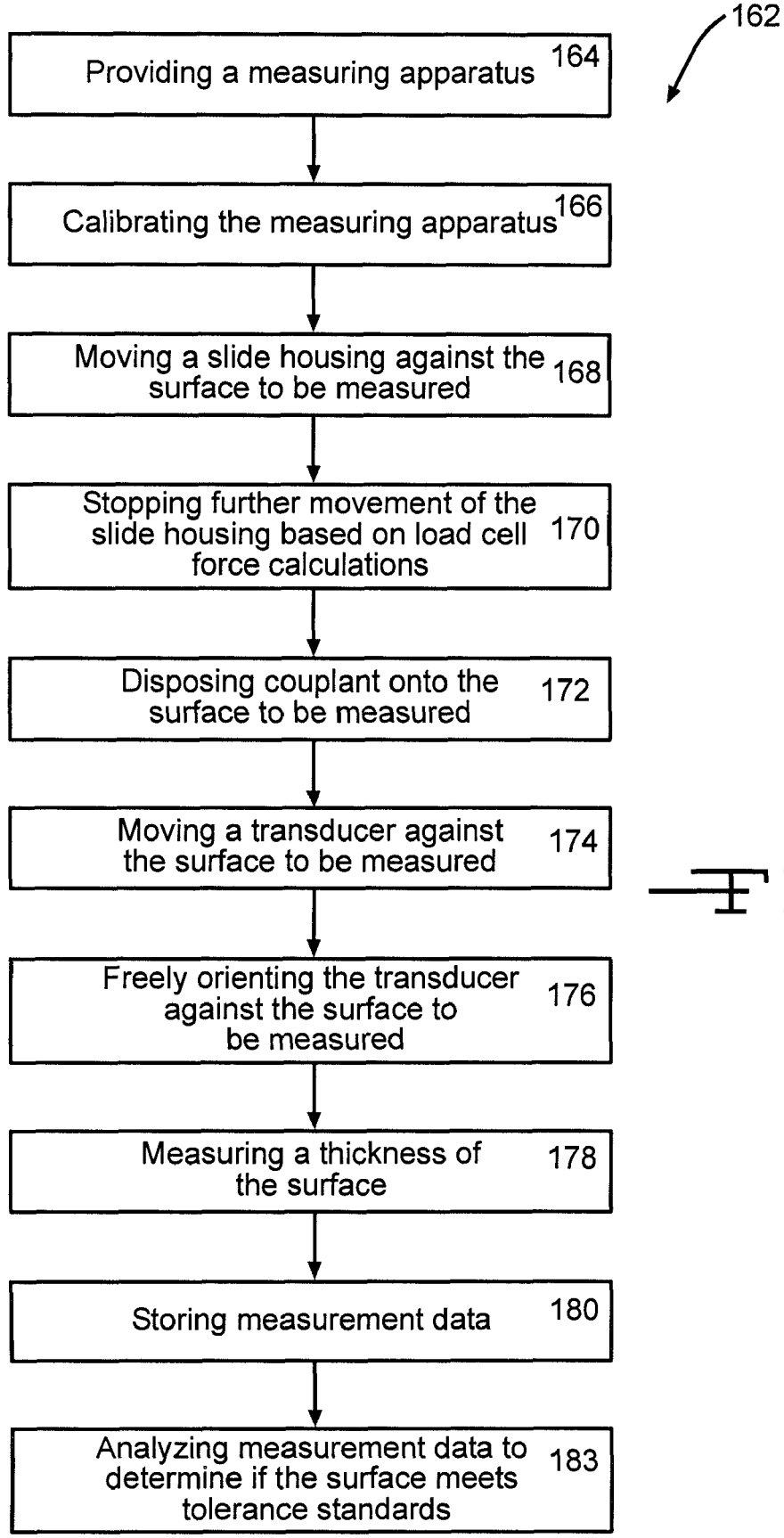

AUTOMATED THICKNESS MEASUREMENT DEVICE

BACKGROUND OF THE DISCLOSURE

It is often necessary to measure the thickness of parts, such as aircraft parts, wing skins, spars, stringers, and other types of aircraft and non-aircraft parts. Some conventional apparatus and methods for measuring the thicknesses of these parts may utilize contact hand gauges, such as calipers and micrometers, or hand-held ultrasonic inspection gauges utilizing water and other couplant types. However, the use of hand gauges may lead to ergonomic issues due to repetitive use, may provide inconsistent results, and/or may take substantial time thereby increasing cost. Moreover, the amount of time required to use these hand-held devices may lead to oxidation of the part being measured when a liquid couplant, such as water, is utilized. Other conventional apparatus and methods may experience varying types of problems.

An apparatus and method for measuring parts is needed which may reduce or eliminate one or more problems of one or more of the conventional apparatus and methods.

SUMMARY OF THE DISCLOSURE

In one aspect of the disclosure, a transducer apparatus may be provided. The transducer apparatus may comprise a slide housing, an inner housing, a member attached to the inner housing, a free-floating transducer housing, a transducer, and transducer springs. The inner housing may be moveably disposed within the slide housing. The member attached to the inner housing may be for moving the inner housing relative to the slide housing. The free-floating transducer housing may in at least one position be freely moveably disposed relative to the inner housing. The transducer may be attached to the free-floating transducer housing and may freely change orientations relative to a surface being measured when the free-floating transducer housing is in the at least one position. The transducer springs may attach the free-floating transducer housing to the inner housing.

In another aspect of the disclosure, an apparatus for measuring the thickness of a surface may be provided. The provided apparatus may comprise a normalizing assembly, a solenoid assembly, and a compliance assembly. The normalizing assembly may comprise a transducer, a free-floating transducer housing which may freely float in at least one position, transducer springs, an inner housing, and a slide housing. The transducer may be attached to the free-floating transducer housing. The transducer springs may be attached between the free-floating transducer housing and the inner housing. The inner housing may be at least partially disposed within the slide housing. The solenoid assembly may comprise a solenoid and a moveable solenoid member. The solenoid and the moveable solenoid member may be for moving the inner housing relative to the slide housing. The compliance assembly may comprise a load cell and at least one compliance housing. The load cell may be for measuring a force applied against the slide housing by a surface to be measured.

In still another aspect of the disclosure, a method may be disclosed for automatically measuring a surface. In one step, a measuring apparatus may be provided. The provided measuring apparatus may comprise a slide housing, a machine, a load cell, a couplant supply device, a solenoid, a transducer attached to a free-floating transducer housing which may freely float in at least one position, and a computer. In another step, the slide housing may be moved against the surface to be measured using the machine. In an additional step, further movement of the slide housing against the surface to be measured may be stopped based on calculations of the load cell regarding an amount of force applied by the slide housing against the surface. In still another step, couplant may be disposed onto the surface to be measured using the couplant supply device. In another step, the transducer may be moved against the surface to be measured using a moveable solenoid member of the solenoid. In yet another step, a transducer surface of the transducer may be oriented substantially parallel to and against the surface to be measured using the free-floating transducer housing. In an additional step, a thickness of the surface may be measured using the transducer. In another step, measurement data regarding the thickness of the surface may be stored using the computer.

These and other features, aspects and advantages of the disclosure will become better understood with reference to the following drawings, description and claims.

BRIEF DESCRIPTION OF THE DRAWINGS

FIG. 2 illustrates a cross-section view through line 2-2 of the embodiment of FIG. 1 with the apparatus disposed apart from the surface;

FIG. 3 illustrates a cross-section view through line 3-3 of the embodiment of FIG. 2;

FIG. 5 illustrates the cross-section view of the embodiment of FIG. 4 with a transducer within the slide housing of the apparatus having been moved against the surface; and FIG. 6 illustrates a flowchart of one embodiment of a method of automatically measuring a surface.

DETAILED DESCRIPTION OF THE DISCLOSURE

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
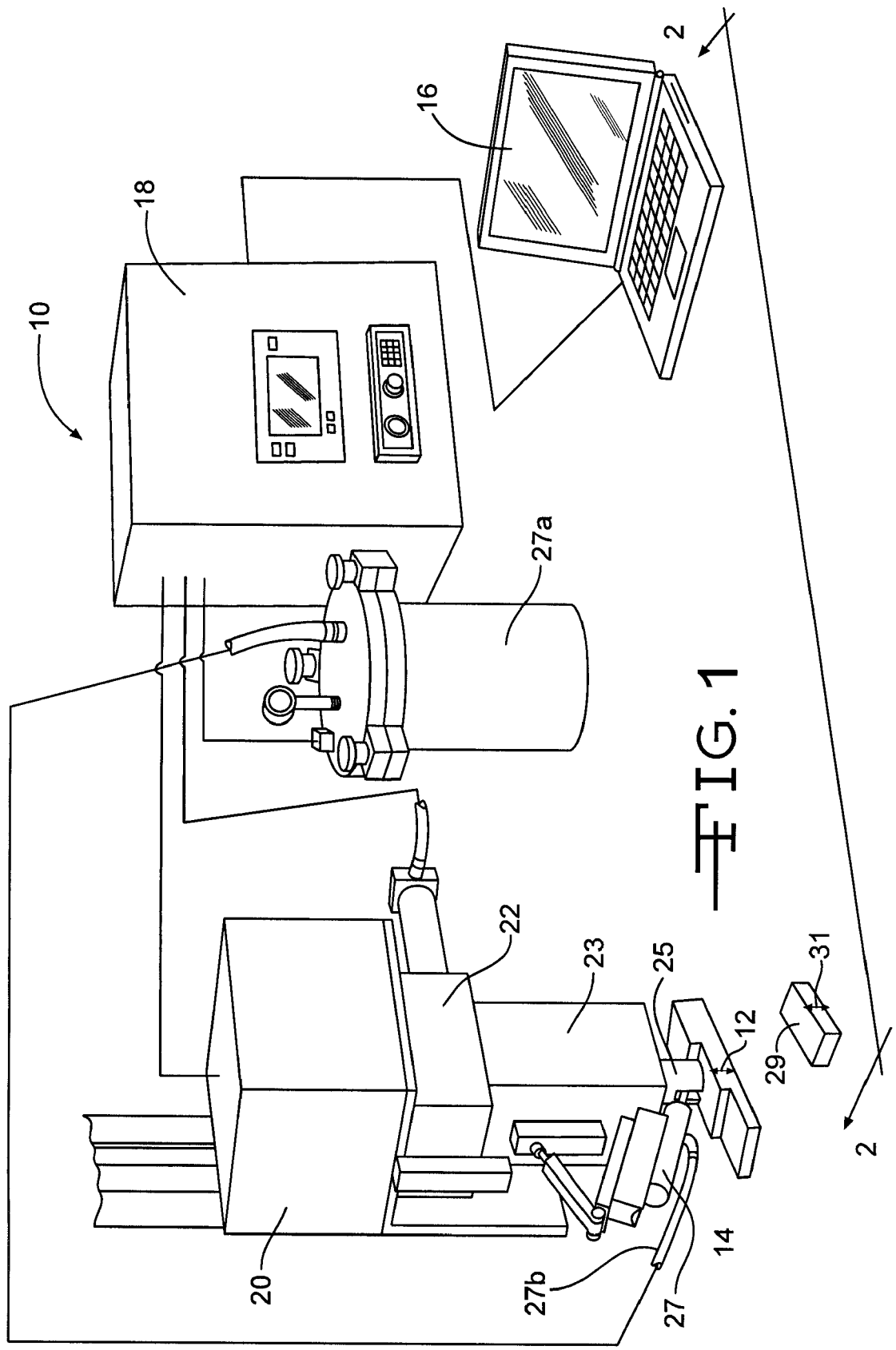
FIG. 1 illustrates a front perspective view of one embodiment of an apparatus for measuring the thickness of a surface.

FIG. 1 illustrates a front perspective view of one embodiment of an apparatus 10 for measuring the thickness 12 of a surface 14. The surface 14 being measured may comprise an airplane surface, a wing skin, a wing spar, a wing stringer, a metal, an alloy, or another type of surface. The apparatus 10 may include a computer 16, a controller 18, a machine 20, a compliance assembly 22, a solenoid assembly 23, a normalizing assembly 25, and a couplant supply device 27. The couplant supply device 27 may comprise a couplant supply tank 27a and a couplant line 27b. A reference standard 29 made of a known material and having a known thickness 31 may be used to calibrate the apparatus 10 prior to measuring the thickness 12 of the surface 14. The computer 16 and/or the controller 18 may be used to control and/or to calibrate the apparatus 10 in order to automatically measure the thickness 12 of the surface 14.

FIG. 2 illustrates a cross-section view through line 2-2 of the embodiment of FIG. 1 with the apparatus 10 disposed apart from the surface 14. As shown in FIG. 2, and as most clearly shown in FIG. 5, the machine 20 may comprise a robot, a milling machine, and/or another type of machine for controlling movement of the apparatus 10. The compliance assembly 22 may include a compliance plate 24, a load cell 26, a compliance spring 28, an upper compliance housing 30, and a lower compliance housing 32. The solenoid assembly 23 may comprise a solenoid housing 34, a solenoid 36, a moveable solenoid member 38, a solenoid plate 40, and a coupler 42. The normalizing assembly 25 may comprise a member 44, a slide housing 46, an inner housing 48, transducer springs 50, a free-floating transducer housing 52, a free-floating transducer housing retaining member 53, a transducer 54, and a transducer line 56. Moveable solenoid member 38 may comprise a moveable solenoid rod. Member 44 may comprise a normalizing rod. The couplant line 27b may extend between the couplant supply tank 27a and the normalizing assembly 25.

As illustrated in FIGS. 1 and 2, the computer 16 and/or the controller 18 may control the machine 20. The machine 20 may be fixedly attached to the compliance plate 24. The compliance plate 24 and the load cell 26 may be fixedly attached to the upper compliance housing 30. The upper compliance housing 30 may be moveably attached to the lower compliance housing 32 to allow relative movement between the upper and lower compliance housings 30 and 32 up and down along direction 33. The upper compliance housing 30 may be moveably disposed into a cavity 32a of the lower compliance housing 32 using linear slide members 32b to move compliance plate 24 up and down along direction 33 thereby moving the attached upper compliance housing 30 relative to the lower compliance housing 32. In other embodiments, any type of mechanism may be used to moveably attach the upper compliance housing 30 to the lower compliance housing 32. One end 28a of the compliance spring 28 may be fixedly attached to the load cell 26. The other end 28b of the compliance spring 28 may be freely disposed. When the end 28b of the compliance spring 28 is disposed apart from the bottom surface 32c of the lower compliance housing 32, the compliance spring 28 may be fully extended. When the upper and lower compliance housings 30 and 32 move towards one another, the end 28b of the compliance spring 28 may abut against a bottom surface 32c of the lower compliance housing 32 in order to compress the compliance spring 28 towards the load cell 26.

The solenoid housing 34 may be fixedly attached to the lower compliance housing 32. The solenoid 36 may be fixedly attached to the solenoid plate 40 attached to the solenoid housing 34. The moveable solenoid member 38 may be moveably attached to the solenoid 36. The solenoid 36 may move the moveable solenoid member 38 up and down along direction 37. One end 38a of the moveable solenoid member 38 may be attached to the solenoid 36, and the other end 38b of the moveable solenoid member 38 may be attached to the coupler 42. One end 44a of the member 44 may be attached to the coupler 42, and another end 44b of the member 44 may be attached to the inner housing 48. In such manner, the solenoid 36 may move the inner housing 48 up and down by moving the moveable solenoid member 38 up and down along direction 37.

The slide housing 46 may be fixedly attached to the solenoid housing 34. The slide housing 46 may comprise a hollow cylinder. The free-floating transducer housing retaining member 53 may be fixedly attached to the inner housing 48. The transducer springs 50, free-floating transducer housing 52, and transducer 54 may be disposed at least partially within a cavity 48a of the inner housing 48. The free-floating transducer housing retaining member 53 may comprise a retaining member ring. The free-floating transducer housing retaining member 53 may be defined by angled surfaces 53a forming a hole 53b. One end 50a of the transducer springs 50 may be attached to a top surface 48b of the inner cavity 48a of the inner housing 48. The other end 50b of the transducer springs 50 may be attached to a top surface 52b of the free-floating transducer housing 52. In this position, the transducer springs 50 may be only partially compressed and the angled surfaces 52c of the free-floating transducer housing 52 may abut in mating arrangement with and against the angled surfaces 53b of the free-floating transducer housing retaining member 53 preventing the free-floating transducer housing 52 from freely floating. The transducer 54 may comprise an ultrasonic transducer or another type of transducer. The transducer 54 may be fixedly attached to the free-floating transducer housing 52. A bottom measuring end 54a of the transducer 54 may extend beyond a bottom surface of the free-floating transducer housing 52. The bottom measuring end 54a of the transducer 54, when the angled surfaces 52c of the free-floating transducer housing 52 are abutted against the angled surfaces 53b of the free-floating housing retaining member 53 with the transducer springs 50 in a partially compressed position, may extend into and out of the hole 53a of the free-floating housing retaining member 53. The couplant line 27b may extend between the couplant supply tank 27a and into the slide housing 46. The couplant supply tank 27a may be supply couplant 27c onto the surface 14 below and/or within the slide housing 46. The couplant 27c may comprise water or another type of couplant.

FIG. 3 illustrates a cross-section view through line 3-3 of the embodiment of FIG. 2. As illustrated in FIG. 3, five transducer springs 50 may be distributed around a perimeter 52a of the free-floating transducer housing 52. In other embodiments, a varying number of transducer springs 50 may be used in varying orientations and/or configurations relative to the inner housing 48 and/or to the free-floating transducer housing 52.

As illustrated in FIG. 2, the computer 16 and/or controller 18 may have instructed the machine 20 to position the slide housing 46 and the transducer 54 apart from the surface 14. In this position, the upper compliance housing 30 may be disposed in a raised position relative to the lower compliance housing 32 so that only a small portion of the upper compliance housing 30 is disposed within the cavity 32a of the lower compliance housing 32, while the compliance spring 28 may be in an extended position apart from the bottom surface 32c of the lower compliance housing 32. The moveable solenoid member 38 may be disposed in a raised position causing the inner housing 48 and the attached free-floating transducer housing retaining member 53 to be in a raised position within the slide housing 46. As a result, the free-floating transducer housing 52, which is abutted against the free-floating transducer housing retaining member 53, and the attached transducer 54 may also be in a raised position at least partly within the cavity 48a of the inner housing 48.

Figure 4:
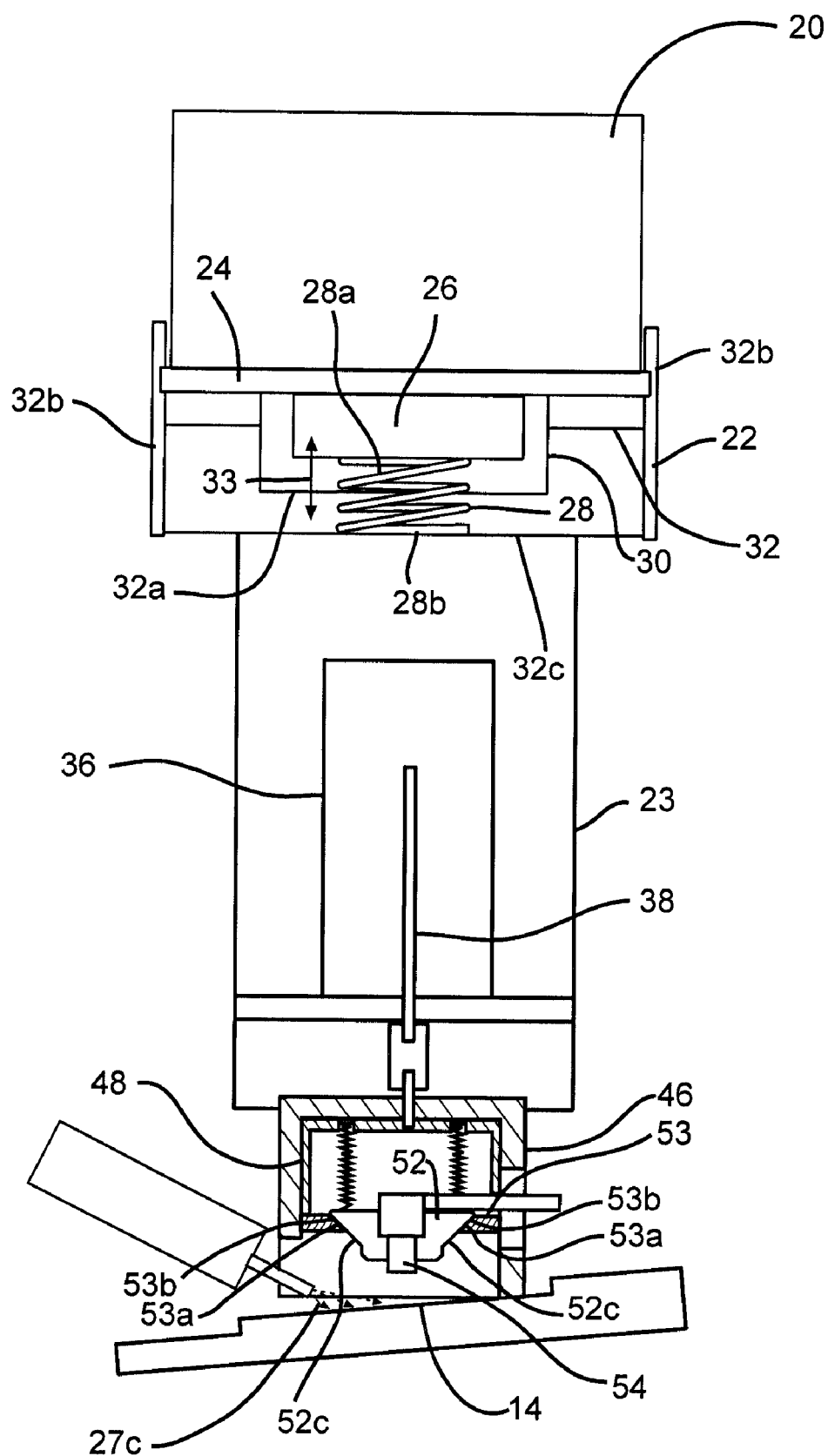
FIG. 4 illustrates the cross-section view of the embodiment of FIG. 2 with a slide housing of the apparatus having been moved against the surface.

FIG. 4 illustrates the cross-section view of the embodiment of FIG. 2 with the slide housing 46 of the apparatus 10 having been moved against the surface 14. The computer 16 and/or controller 18 (not shown in FIG. 4) may have instructed the machine 20 to have moved the compliance plate 24 downward causing the compliance assembly 22, the solenoid assembly 23, and the slide housing 46 to move downward to position the slide-housing 46 against the surface 14. When the slide housing 46 abutted against the surface 14, the force of the surface 14 may have caused the upper compliance housing 30 to have moved towards the bottom surface 32c of the lower compliance housing 32. The end 28b of the compliance spring 28 may have abutted against the bottom surface 32c of the lower compliance housing 32 thereby compressing the compliance spring 28 towards the load cell 26. The load cell 26 may have measured the compression of the compliance spring 28, and may have stopped the machine 20 from further moving the slide housing 46 against the surface 14 when the amount of force applied by the slide housing 46 against the surface 14 reached a desired amount of force for the surface 14 being measured. The desired amount of force may have been based on the material of the surface 14 and/or other factors. In such manner, the load cell 26 may avoid the surface 14 and/or the slide housing 46 from being damaged.

The solenoid 36 may have kept the moveable solenoid member 38 in a raised position, while the slide housing 46 abutted against the surface 14, so that the inner housing 48, the attached free-floating transducer housing retaining member 53, the free-floating transducer housing 52, and the transducer 54 remained in their raised positions within the slide housing 46. In such manner, the transducer 54 may remain disposed apart from the surface 14 in a raised position inside the slide housing 46. The computer 16 and/or controller 18 (not shown in FIG. 4) may have instructed the couplant supply tank 27a (not shown in FIG. 4) to dispose couplant 27c onto the surface 14 within and/or below the slide housing 46 with the transducer 54 in the raised position within the slide housing 46.

FIG. 5 illustrates the cross-section view of the embodiment of FIG. 4 with the transducer 54 within the slide housing 46 having been moved against the surface 14. The computer 16 and/or controller 18 may have instructed the solenoid 36 to have moved the moveable solenoid member 38 downward towards the surface 14. This may have caused the inner housing 48, attached to the moveable solenoid member 38 with the coupler 42 and the member 44, and the attached free-floating transducer housing retaining member 53 to have moved relative to and within the slide housing 46 towards the surface 14. The downward movement of the inner housing 48 may have caused a bottom measuring surface 54a of the transducer 54, sticking out of the hole 53a of the free-floating transducer housing retaining member 53, to abut against the surface 14. When the bottom measuring surface 54a of the transducer 54 abutted against the surface 14, the force of the surface 14 against the bottom measuring surface 54a of the transducer 54 may have forced the angled surfaces 52c of the attached free-floating transducer housing 52 to have moved upwardly to separate from the angled surfaces 53b of the free-floating transducer housing retaining member 53. As a result, the transducer springs 50 may have further compressed upwardly allowing the free-floating transducer housing 52 and the attached transducer 54 to freely float apart from and relative to the free-floating transducer housing retaining member 53. In the free-floating position, the free-floating transducer housing 52 and the attached transducer 54 may freely move in varying directions and orientations, by moving up and down, sideways, at an angle, and/or rotating in order to orient the bottom measuring surface 54a of the transducer 54 to be substantially parallel to and against the surface 14 to be measured by the transducer.

The transducer 54 may have taken measurements of the thickness of the surface 14 by emitting an ultrasonic signal 60, reflecting the ultrasonic signal 60 off a bottom surface 14a of the surface 14, and receiving the reflected ultrasonic signal 60. The free-floating transducer housing 52 may allow the bottom measuring surface 54a of the transducer 54 to be rotated from between three to five degrees relative to the surface 14 and still take accurate measurements of the thickness 12 of the surface 14. In other embodiments, the free-floating transducer housing 52 may allow the bottom measuring surface 54a of the transducer 54 to be rotated in varying amounts while still taking accurate measurements of the thickness 12 of the surface 14.

The computer 16 may calculate the thickness 12 of the surface 14 based on the measurements taken by the transducer 54. The computer 16 may calculate the thickness 12 of the surface 14 based on a known velocity of the ultrasonic signal 60, a known material of the surface 14, and a time of flight of the ultrasonic signal 60 between the transducer 54 and the surface 14. The computer 16 may store the measurements of the thickness 12 of the surface 14, and may determine if the thickness 12 of the surface 14 meets tolerance standards. Based on the determination, the surface 14 may be accepted or rejected.

FIG. 6 illustrates a flowchart of one embodiment of a method 162 of automatically measuring a surface 14. The surface 14 may comprise an airplane surface, a wing skin, a wing spar, a wing stringer, or another type of surface. In step 164, a measuring apparatus 10 may be provided. The provided measuring apparatus 10 may comprise a computer 16, machine 20, a load cell 26, a solenoid 36, a slide housing 46, an inner housing 48, a fee-floating transducer housing retaining member 53 attached to the inner housing 48, a transducer 54 attached to a free-floating transducer housing 52, transducer springs 50 attached between the free-floating transducer housing 52 and the inner housing 48, and a couplant supply device 27. The machine 20 may comprise a milling machine, a robot, and/or another type of machine. The transducer 54 may comprise an ultrasonic transducer or another type of transducer. In other embodiments, the provided measuring apparatus 10 may comprise any of the embodiments disclosed herein. In still other embodiments, the provided measuring apparatus 10 may vary.

In step 166, the measuring apparatus 10 may be calibrated using a reference standard 29 and at least one of the computer 16 and a controller 18. The reference standard 29 may comprise a known thickness 31 and a known material. In step 168, the slide housing 46 may be moved against the surface 14 to be measured using the machine 20. In step 170, further movement of the slide housing 46 against the surface 14 to be measured may be stopped based on calculations of the load cell 26 regarding an amount of force applied by the slide housing 46 against the surface 14. In step 172, couplant 27c may be disposed onto the surface 14 to be measured using the couplant supply device 27.

In step 174, the transducer 54 may be moved against the surface 14 to be measured using a moveable solenoid member 38 of the solenoid 36. Step 174 may comprise the moveable solenoid member 38 moving the inner housing 48 relative to the slide housing 46. In step 176, a bottom measuring surface 54a of the transducer 54 may be freely oriented substantially parallel to and against the surface 14 to be measured as a result of the free-floating transducer housing 52. Step 176 may comprise the free-floating transducer housing 52 separating from the free-floating transducer housing retaining member 53 to compress the transducer springs 50 and to orient the bottom measuring surface 54a of the transducer 54 substantially parallel to and against the surface 14 to be measured. This may result from the free-floating transducer housing 52 and the attached transducer 54 freely moving in varying directions and orientations, by moving up and down, sideways, at an angle, and/or rotating in order to position the bottom measuring surface 54a of the transducer 54 substantially parallel to and against the surface 14 to be measured.

In step 178, a thickness 12 of the surface 14 may be measured using the transducer 54. Step 178 may comprise emitting an ultrasonic signal 60 from the ultrasonic transducer 54, reflecting the ultrasonic signal 60 off a bottom surface 14a of the surface 14, receiving the reflected ultrasonic signal 60 with the ultrasonic transducer 54, and calculating the thickness 12 of the surface 14 based on a known velocity of the ultrasonic signal 60, based on a known material of the surface 14, and based on a time of flight of the ultrasonic signal 60 between the ultrasonic transducer 54 and the surface 14.

In step 180, measurement data regarding the thickness 12 of the surface 14 may be stored using the computer 16. In step 182, the stored measurement data may be analyzed to determine if the surface 14 meets tolerance standards in order to accept or reject the surface 14. In other embodiments, one or more of the steps of the method 162 may be changed in order, deleted, or altered. In still other embodiments, varying steps may be added. The steps of the method 162 may be done automatically in less than two seconds. In other embodiments, the steps of the method 162 may be done automatically in varying amounts of time.

One or more embodiments of the disclosure may reduce or eliminate one or more problems associated with one or more of the conventional apparatus and/or methods for measuring the thickness of a surface. For instance, one or more embodiments of the disclosure may: allow a surface to be automatically measured in less than two seconds thereby saving time, saving labor, saving cost, and reducing the likelihood of a couplant oxiding the surface; may allow for angular deviations of the transducer while still taking accurate measurements of the surface; may be completely automated and computer-controlled thereby increasing accuracy and reducing or eliminating repetitive injuries to operators; may reduce the need for extra manufacturing processes due to the resulting increased tolerance-accuracy of measured surfaces; or may reduce and/or eliminate other types of problems.

It should be understood, of course, that the foregoing relates to exemplary embodiments of the disclosure and that modifications may be made without departing from the spirit and scope of the disclosure as set forth in the following claims.

I claim:

1. A transducer apparatus comprising:
   a slide housing;
   an inner housing moveably disposed within the slide housing;
   a member attached to the inner housing for moving the inner housing relative to the slide housing;
   a free-floating transducer housing which in at least one position is freely moveably disposed relative to the inner housing;
   a transducer attached to the free-floating transducer housing, such that the transducer is able to freely change orientations relative to a surface being measured when the free-floating transducer housing is in the at least one position; and
   transducer springs attaching the free-floating transducer housing to the inner housing.

2. The transducer apparatus of claim 1 further comprising a free-floating transducer housing retaining member attached to the inner housing, the free-floating transducer housing retaining member being defined by a hole having angled surfaces for mating against angled surfaces of the free-floating transducer housing when the free-floating transducer housing is in a non-free-floating position.

3. The transducer apparatus of claim 1 wherein the inner housing comprises an inner cavity and at least a portion of the transducer springs and at least a portion of the free-floating transducer housing are disposed within the inner cavity.

4. The transducer apparatus of claim 1 wherein the member comprises a rod attached to at least one of a coupler, a solenoid rod, and a solenoid.

5. The transducer apparatus of claim 3 wherein ends of the transducer springs are attached to a top surface of the inner cavity and opposing ends of the transducer springs are attached to a top surface of the free-floating transducer housing.

6. The transducer apparatus of claim 1 wherein the transducer springs are attached around a perimeter of the free-floating transducer housing.

7. The transducer apparatus of claim 6 wherein five transducer springs are attached around the perimeter of the free-floating transducer housing.

8. The transducer apparatus of claim 1 wherein the transducer comprises an ultrasonic transducer and a measuring end of the ultrasonic transducer extends beyond a bottom surface of the free-floating transducer housing.

9. An apparatus for measuring a thickness of a surface comprising:
   a normalizing assembly comprising a transducer, a free-floating transducer housing which freely floats in at least one position, transducer springs, an inner housing, and a slide housing, wherein the transducer is attached to the free-floating transducer housing, the transducer springs are attached between the free-floating transducer housing and the inner housing, and the inner housing is at least partially disposed within the slide housing;
   a solenoid assembly comprising a solenoid and a moveable solenoid member, wherein the solenoid and the moveable solenoid member are for moving the inner housing relative to the slide housing; and
   a compliance assembly comprising a load cell and at least one compliance housing, wherein the load cell is for measuring a force applied against the slide housing by the surface to be measured.

10. The apparatus of claim 9 further comprising a couplant supply device for supplying couplant onto the surface to be measured by the transducer of the apparatus.

11. The apparatus of claim 9 wherein the normalizing assembly further comprises a free-floating transducer housing retaining member attached to the inner housing, the free-floating transducer housing retaining member being defined by a hole having angled surfaces for mating against angled surfaces of the free-floating transducer housing when the free-floating transducer housing is in a non-free-floating position.

12. The apparatus of claim 9 wherein five transducer springs are attached between the free-floating transducer housing and the inner housing.

13. The apparatus of claim 9 wherein the moveable solenoid member comprises a solenoid rod attached to a coupler, wherein the coupler is attached to another rod, wherein the another rod is attached to the inner housing.

14. The apparatus of claim 9 wherein the transducer comprises an ultrasonic transducer and a measuring end of the ultrasonic transducer extends beyond a bottom surface of the free-floating transducer housing.

15. The apparatus of claim 9 wherein the compliance assembly comprises an upper compliance housing, a lower compliance housing, and a compliance spring, wherein the upper and lower compliance housings are moveably disposed relative to each other and the compliance spring compresses and extends as the upper and lower compliance housings move relatively to each other.

16. The apparatus of claim 9 further comprising at least one of a machine, a robot, and a milling machine for moving the normalizing assembly, the solenoid assembly, and the compliance assembly relative to a surface to be measured.

17. The apparatus of claim 9 further comprising at least one of a computer and a controller for at least one of storing thickness data measured by the apparatus, calibrating the apparatus, and controlling the apparatus.

18. A method of automatically measuring a surface comprising:
providing a measuring apparatus comprising a slide housing, a machine, a load cell, a couplant supply device, a solenoid, a transducer attached to a free-floating transducer housing which freely floats in at least one position, and a computer;
moving the slide housing against the surface to be measured using the machine;
stopping further movement of the slide housing against the surface to be measured based on calculations of the load cell regarding an amount of force applied by the slide housing against the surface;
disposing couplant onto the surface to be measured using the couplant supply device;
moving the transducer against the surface to be measured using a moveable solenoid member of the solenoid;
orienting a transducer surface of the transducer substantially parallel to and against the surface to be measured using the free-floating transducer housing;
measuring a thickness of the surface using the transducer; and
storing measurement data regarding the thickness of the surface using the computer.

19. The method of claim 18 further comprising the step of analyzing the stored measurement data to determine if the surface meets tolerance standards.

20. The method of claim 18 further comprising the step of calibrating the measuring apparatus using a reference standard and at least one of the computer and a controller, wherein the reference standard comprises a known thickness and a known material.

21. The method of claim 18 wherein the machine comprises at least one of a milling machine and a robot.

22. The method of claim 18 wherein the providing a measuring apparatus further comprises an inner housing, and the moving the transducer step further comprises the moveable solenoid member moving the inner housing relative to the slide housing.

23. The method of claim 22 wherein the providing a measuring apparatus further comprises transducer springs attached between the free-floating transducer housing and the inner housing, and the orienting step further comprises the transducer springs freely orienting the transducer surface of the transducer substantially parallel to and against the surface to be measured.

24. The method of claim 23 where the providing a measuring apparatus further comprises a free-floating transducer housing retaining member attached to the inner housing, the free-floating transducer housing retaining member being defined by a hole having surfaces which mate against surfaces of the free-floating transducer housing preventing the free-floating transducer housing from freely-floating until the step of moving the transducer against the surface, and at least one of the steps of moving the transducer against the surface and orienting the transducer surface further comprises the surfaces of the free-floating transducer housing separating from the surfaces of the hole of the free-floating transducer housing retaining member in order to freely-float the transducer housing.

25. The method of claim 18 wherein the transducer of the providing a measuring apparatus comprises an ultrasonic transducer, and the measuring the thickness step comprises emitting an ultrasonic signal from the ultrasonic transducer, reflecting the ultrasonic signal off a bottom surface of the surface, receiving the reflected ultrasonic signal with the ultrasonic transducer, and calculating the thickness of the surface based on a known velocity of the ultrasonic signal, a known material of the surface, and a time of flight of the ultrasonic signal between the transducer and the surface.

* * * * *